March 17, 1964  P. HOPPE  3,125,617
METHOD OF MANUFACTURING A CELLULAR POLYURETHANE
UNITARY SHOE SOLE AND HEEL
Filed Jan. 28, 1959

INVENTOR.
PETER HOPPE

BY
ATTORNEYS 3,125,617
METHOD OF MANUFACTURING A CELLULAR POLYURETHANE UNITARY SHOE SOLE AND HEEL
Peter Hoppe, Troisdorf, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed Jan. 28, 1959, Ser. No. 789,715
4 Claims. (Cl. 264—54)

This invention relates to a method of manufacturing a resilient polyurethane shoe sole and heel and, more particularly, to a new cellular polyurethane unitary shoe sole and heel.

This application is a continuation-in-part of my co-pending application Serial Number 509,985, filed May 20, 1955, now abandoned.

It has been known heretofore to provide shoe soles of reslient materials, such as, unvulcanized crepe rubber and the like. The use of such material for shoe soles has not always proved entirely satisfactory for a number of reasons. For example, the shoe soles must be cut from sheets or webs of the material so that there is a considerable amount of waste trim. Moreover, the tread surface of such soles must be shaped by carrying out a separate and subsequent operation on the soles themselves. The heretofore known soles may only be assembled with the shoe upper and heel by a difficult, time consuming operation. Other disadvantages of soles made from conventional resilient materials, such as, crepe rubber, consists of their relatively heavy weight and their sensitivity to heat.

Elastic non-cellular rubber-like polyurethane elastomers which are suitable for shoe soles are disclosed in United States Patent No. 2,621,166, issued December 9, 1952, to Schmidt et al. However, the elastomers are not suitable where resilient light weight shoe soles are desired. It has also been known heretofore to provide cellular polyurethan plastics by reacting polyesters, diisocyanates, and water. However, the heretofore known cellular polyurethanes have always been extremely light weight, rigid materials entirely unsuitable for use in shoe soles.

It is, therefore, a primary object of the invention to provide a method for making a resilient cellular polyurethane unitary shoe sole and heel within a predetermined density range which is required for optimum results. Still another object of the invention is to manufacture a relatively lightweight polyurethane shoe soling material having a greatly improved resistance to abrasion as compared with the ordinary soling materials, such as, rubber, leather, and the like.

Other objects will become apparent from the following detailed description of the invention with reference to the drawings in which.

Figure 1:
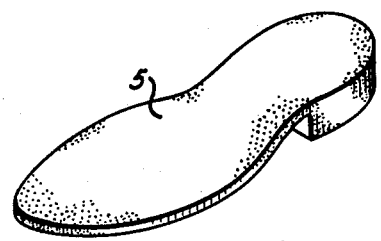
FIGURE 1 is a perspective view illustrating one preferred embodiment of the resilient cellular polyurethane unitary shoe sole and heel of the invention.

The above objects and others are accomplished, generally speaking, by providing resilient cellular polyurethane molded unitary shoe sole and heel having a density of from about 25 to about 50 pounds per cubic foot from foamable mixtures of organic compounds having reactive hydrogen atoms capable of reacting with an NCO group and a molecular weight of at least about 500, a diisocyanate, water, and a suitable accelerator.

Any suitble organic compound having reactive hydrogen atoms capable of reacting with an NCO group and a molecular weight of at least about 500 may be used in accordance with the invention. Such suitable compounds are, for example, substantially hydroxyl terminated polyesters, polyester amides, polyalkylene ether glycols, and polythioether glycols. While any suitable compound as above defined may be used in acordance with the invention, it is preferred that the organic compound having reactive hydrogen atoms capable of reacting with an NCO group and a molecular weight of at least about 500 comprise an hydroxyl polyester, preferably an hydroxyl polyester having an hydroxyl number of from about 80 to about 440 and an acid number of from about 2 to about 40. Suitable hydroxyl polyesters may be obtained by esterifying an excess of dihydric or polyhydric alcohols with dicarboxylic acids. The esterification preferably may be carried out by thermocondensation at temperatures of from about 150° C. to about 220° C.

Examples of suitable dihydric or trihydric alcohols are ethylene glycol, propylene glycol, 1,4-butylene glycol, hexane diol, hexane triol, glycerine, trimethylol propane, and the like. Suitable dicarboxylic acids are, for example, succinic acid, adipic acid, sebacic acid, phthalic acid, and the like. The dihydric and trihydric alcohols may be used in admixture; and by increasing the amount of trihydric alcohol used, it is readily possible to produce polyesters with a varying degree of branching which will in turn effect the resiliency of the cellular polyurethane product.

While it is preferred to use hydroxyl polyesters as the compound having reactive hydrogen atoms and a molecular weight of at least about 500, it is to be understood that any such suitable compound may be used if desired in accordance with the invention. Suitable compounds, other than hydroxyl polyesters, having reactive hydrogen atoms and a molecular weight of at least about 500, are, for example, polyester amides, polyalkylene ether glycols, polythioether glycols, as well as condensation products of polyhydric alcohols with alkylene oxides. It is believed advisable to point out that polyester amides may be prepared by thermocondensation of dicarboxylic acids with amino alcohols, such as, ethanol amine, diethanol amine, 3-amino propylene, hydroxy ethyl aniline, and the like, or mixtures of polyhydric alcohols and amines, such as, ethylene diamine, piperazine, diethylene triamine, hexamethylene diamine, phenylene diamine, and the like.

Polyalkylene ether glycols may be prepared by condensing any suitable alkylene oxide, such as, for example, ethylene oxide, propylene oxide, butylene oxide, or mixtures thereof, and the like. Branched polyaddition products may be obtained by condensing the alkylene oxides with polyhydric alcohols, such as, trimethanol propane, glycerine, pentaerythritol, and the like.

Polythioether glycols may be prepared by condensing any suitable thioglycol, such as, thiodiglycol, with a polyhydric alcohol, such as, ethylene glycol, propylene glycol, glycerine, and the like.

Any suitable organic diisocyanate may be used in accordance with the invention, such as, for example, 1,5-naphthalene diisocyanate, paraphenylene diisocyanate, 4,4'-diphenylmethane diisocyanate, 2,4 and 2,6-tolylene diisocyanate and mixtures thereof, 2,4-tolylene diisocyanate dimers, 4,4',4''-triphenyl methane triisocyanate, and the like.

Any suitable accelerator to catalyze the reaction may be used in accordance with the invention. Examples of suitable accelerators include the tertiary amines, such as, for example, hexahydro dimethyl aniline, and the adipic ester of N-diethyl aminoethanol, or metallic salts soluble in organic solvents, such as, ferric acetonyl acetate. These accelerators are suitable at temperatures up to about 70° C. Sodium phenate and dibutyl phthalate are suitable accelerators at temperatures between about 70° C. and about 170° C.

Water in an amount of from about 0.5% to about 3% must be present in order to react with an isocyanate group to evolve carbon dioxide. The water may be added as such or may be contained in fillers and the like.

According to one method of the invention, the unitary polyurethane shoe sole and heel is obtained by stirring a foamable mixture of a hydroxyl polyester, a diisocyanate, a tertiary amine, preferably, hexahydro dimethyl aniline as an accelerator, water and fillers for a short period, for example, 30 seconds, and at a temperature of from about 70° C. to about 75° C. Then this mixture is poured into suitable molds which have been heated to a temperature of from about 60° C. to about 80° C. The resulting mixture completely fills the cavity of the mold due to the spontaneous blowing action of carbon dioxide which is evolved from the reaction of an isocyanate group with water. The article hardens in about 15 to about 20 minutes and may be removed from the mold.

According to another method, the novel resilient cellular polyurethane unitary shoe sole and heel may be provided by heating a hydroxyl polyester to about 180° C. The hydroxyl polyester may contain fillers and the like if desired. A diisocyanate is added in a finely divided powdered form to the polyester after it is cooled to about 150° C. The mixture is cooled further to about 70° C. and is then cast into a suitable mold at this temperature after adding an accelerator and stirring additionally for about 30 seconds. The foaming and hardening will take place as previously described.

According to still another method, the new and novel polyurethane material may also be produced by heating a hydroxyl polyester to about 160° C., introducing sodium phenate as an accelerator, and a finely divided powdered diisocyanate successively into an oscillating shoe sole mold which is fixed on a vibrating table and which is maintained at a temperature of from about 110° C. to about 120° C. After vibrating for a further 30 seconds, the mixture is so thoroughly mixed that the final expansion and hardening is completed 30 seconds after the mold has become stationary.

The resilient cellular polyurethane unitary shoe sole and heel provided in accordance with the invention is characterized by being very light weight and exhibiting a resistance to abrasion of about 10 times that of crepe rubber.

Referring again to the drawings for a more detailed description of the invention, FIGURE 1 is a perspective view illustrating a resilient cellular polyurethane unitary shoe sole and heel 5 having a density of from about 25 to about 50 pounds per cubic foot.

Figure 2:
FIGURES 2, 3 and 4 are cross-sectional views illustrating one method for providing a unitary cellular polyurethane shoe sole and heel in accordance with the invention.
Figure 3:
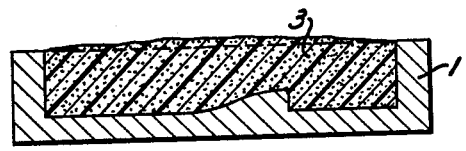
Figure 4:
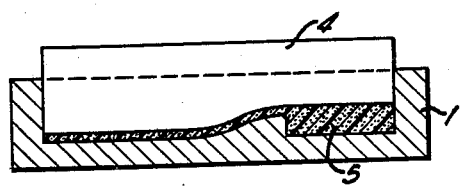

FIGURES 2 through 4 illustrate a method of manufacture described hereinafter in Example 1. A foaming mixture 2 of polyester, diisocyanate, and activator is introduced into the mold 1 in a first step. After the mixture has reacted and expanded 3, a plunger 4 is applied compressing the cellular polyurethane to provide a shaped unitary polyurethane shoe sole and heel 5.

Figure 5:
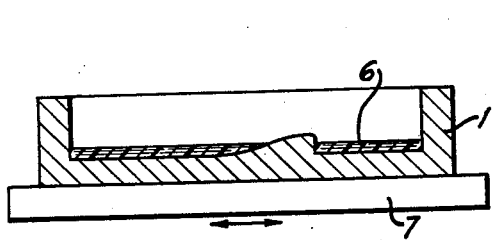
FIGURES 5 and 6 are cross-sectional views illustrating yet another method of providing a cellular polyurethane unitary shoe sole and heel in accordance with the invention.
Figure 6:
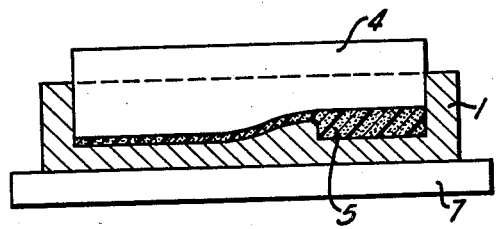

FIGURES 5 and 6 illustrate the method described in Example 3. A mold is attached to a vibrating table 7 and the components of a liquid foamable mixture 6 are successively introduced into the mold which is maintained at a temperature of about 140° C. The plunger 4 is immediately applied. The foaming operation is carried out in the closed mold against the stationary plunger 4 to provide the shaped unitary polyurethane shoe sole and heel 5.

The invention is further illustrated, without limitation thereto, by the following examples in which the parts are by weight.

*Example 1*

100 parts of a polyester prepared from 2.5 mols of adipic acid, 0.5 mol of phthalic acid and 4 mols of hexanetriol are heated to a temperature of 135° C. and 25 parts of pulverized 1,5-naphthalene diisocyanate introduced; the components are thoroughly mixed until the diisocyanate has melted completely. The mixture is then cooled to 75° C. with intense mixing and stirring by means of a stirrer. Thereupon 1 part of water and 0.5 part of hexahydro dimethyl aniline are introduced. After stirring for 10 seconds, the mixture is cast into the mold which has been heated to 68° C. The foaming process starts immediately and the mixture expands to form a foamed mass having a bulk density of about 9 pounds per cubic foot. As soon as the foaming process has finished, the mold is closed with the plunger and the mixture compressed to the desired volume.

The foamed product has a bulk density of about 25 to 31 pounds per cubic foot. After about 8 minutes the shaped element can be removed from the mold. It is preferable to cure the shaped element to a temperature of 100° C. for about 90 minutes.

*Example 2*

100 parts of a polyester prepared from 11 mols of ethylene glycol and 10 mols of adipic acid are fed at 140° C. into a mold heated to 140° C., which is attached to an oscillation table. 25 parts of 1,5-naphthalene diisocyanate are poured into the oscillating mold; intense mixing of the components occurs instantaneously while the diisocyanate is melted. After oscillating for about 10 seconds, 2 parts of an activator consisting of 1 part of sodium phenate and 9 parts of dibutyl phthalate are introduced. After oscillating once more for about 7 seconds, oscillation is stopped; the foaming process starts immediately. As described in Example 1, the plunger is applied to the mold as soon as the foaming has finished, and the foamed mass is compressed to a volume of 25 pounds per cubic foot.

*Example 3*

The process of Example 2 can also be carried out by applying the plunger immediately after introducing the activator and the diisocyanate component into the polyester component. In this embodiment, oscillation of the mold has to be interrupted for a short time. The foaming process is carried out in the closed mold against the stationary plunger. When proceeding in this manner, the distribution of the bulk density over the shaped element formed in the mold is essentially more homogeneous than in the process of Example 2.

As a rule, care has to be taken that the temperatures given in the examples, to which the products and the mold are subjected, are observed accurately. The application of 1 or 2° C. below or above the above said temperatures would deleteriously affect the properties of the shaped elements.

*Example 4*

100 parts of the polyester described in Example 1 are heated to a temperature of 135° C. and mixed with 25 parts of p-phenylene diisocyanate. The mixture is then cooled to 75° C. with intense mixing and stirring. Thereupon 1 part of water and 0.5 part of the adipic ester of N-diethyl amino ethanol are introduced. After stirring for 10 seconds, the mixture is cast into the mold which has been heated to 68° C. The foaming process starts immediately and the mixture expands to form a foamed mass having a bulk density of about 9 pounds per cubic foot. As soon as the foaming process has finished, the mold is closed with the plunger and the mixture compressed to the desired volume. After about 8 minutes, the shaped element can be removed from the mold. It is preferable to cure the shaped elements at a temperature of 100° C. for about 90 minutes.

It is to be understood that any suitable polyester as hereinbefore described may be substituted for the polyesters described in the foregoing examples. Likewise, it is to be understood that any of the hereinbefore listed polyisocyanates may likewise be substituted and that any of the hereinbefore listed accelerators likewise may be substituted in the foregoing examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for producing a resilient light-weight shoe sole which comprises introducing into a mold having the configuration of a shoe sole, a foamable composition which comprises an hydroxyl polyester obtained from a polyhydric alcohol and a dicarboxylic acid, an organic diisocyanate, water and an accelerator, oscillating said mold to cause the mixing of said components and effecting foaming of said composition to the desired volume and cross-sectional shape.

2. A process for producing a resilient light-weight shoe sole, which comprises introducing into a mold having the configuration of a shoe sole, an hydroxyl polyester obtained from a polyhydric alcohol and a dicarboxylic acid, an organic diisocyanate, water and an accelerator, mixing the materials so introduced by oscillating said mold, effecting foaming of the resulting mixture and compressing the foamed mass to the desired volume and cross-sectional shape.

3. A process for producing a resilient light weight shoe sole which comprises introducing an hydroxyl polyester obtained from a polyhydric alcohol, a dicarboxylic acid, water, an accelerator and an organic polyisocyanate in a finely powdered condition into an oscillating mold, continuing oscillating said mold until the reactants are mixed, stopping the oscillation of said mold and permitting the formation of the cellular foamed mass in the stationary mold.

4. A process for producing a resilient light weight shoe sole which comprises introducing an hydroxyl polyester obtained from a polyhydric alcohol, a dicarboxylic acid, water, an accelerator and an organic polyisocyanate in a finely powdered condition into an oscillating mold, said mold having a plunger resting freely thereon, continuing oscillating said mold until the reactants are mixed, stopping the oscillation of said mold and permitting the formation of the cellular foamed mass in the stationary mold.

References Cited in the file of this patent

UNITED STATES PATENTS

| | | |
|---|---|---|
| 371,316 | Hayward | Oct. 11, 1887 |
| 1,433,045 | Tabourin | Oct. 24, 1922 |
| 1,513,801 | Camp | Nov. 4, 1924 |
| 2,071,647 | Miller | Feb. 23, 1937 |
| 2,336,944 | Madge et al. | Dec. 14, 1943 |
| 2,600,942 | Vanacker | June 17, 1952 |
| 2,642,403 | Simon et al. | June 16, 1953 |
| 2,764,565 | Hoppe et al. | Sept. 25, 1956 |
| 2,827,665 | Rogers et al. | Mar. 25, 1958 |
| 2,846,408 | Brochhagen et al. | Aug. 5, 1958 |
| 2,875,989 | Toulmin | Mar. 3, 1959 |

FOREIGN PATENTS

| | | |
|---|---|---|
| 808,285 | Germany | July 12, 1951 |
| 716,422 | Great Britain | Oct. 6, 1954 |

OTHER REFERENCES

De Bell et al.: "German Plastics Practice," 1946, pages 300 and 310.

Kunststoffe, Leichtstoffe und Leichtstoffanwendung (Light Weight Materials and Their Uses), Bd. 42, Heft 12, 1952, pages 450–459.

Modern Plastics, "Polyurethane," November 1954, pages 106–8, 214–6.

Modern Plastics, "Foamed Isocyanates," February 1955, pages 140–3.